(12) United States Patent
Kitayama et al.

(10) Patent No.: US 11,067,289 B2
(45) Date of Patent: Jul. 20, 2021

(54) COOKER (71) Applicant: SHARP KABUSHIKI KAISHA, Sakai (JP)

(72) Inventors: Hiroki Kitayama, Sakai (JP); Kazuya Kitatani, Sakai (JP); Masayuki Uno, Sakai (JP); Shinya Ueda, Sakai (JP); Masayuki Iwamoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 477 days.

(21) Appl. No.: 16/078,236

(22) PCT Filed: Jan. 19, 2017

(86) PCT No.: PCT/JP2017/001748
§ 371 (c)(1),
(2) Date: Aug. 21, 2018

(87) PCT Pub. No.: WO2018/029873
PCT Pub. Date: Feb. 15, 2018

(65) Prior Publication Data
US 2021/0088222 A1 Mar. 25, 2021

(30) Foreign Application Priority Data
Aug. 10, 2016 (JP) .............................. JP2016-158160

(51) Int. Cl.
F24C 15/02 (2006.01)
A21B 1/36 (2006.01)
(Continued)

(52) U.S. Cl.
CPC ................ F24C 15/02 (2013.01); A21B 1/36 (2013.01); F24C 1/00 (2013.01); F24C 9/00 (2013.01);
(Continued)

(58) Field of Classification Search
CPC .. F24C 15/02; F24C 15/14; F24C 1/00; F24C 9/00; A47J 2027/043; A21B 1/36; A21B 1/26
(Continued)

(56) References Cited

U.S. PATENT DOCUMENTS 5,158,064 A   10/1992   Willis et al.
5,619,983 A    4/1997   Smith
(Continued)

FOREIGN PATENT DOCUMENTS

CN   201218542 Y   4/2009
CN   102112811 A   6/2011
(Continued)

OTHER PUBLICATIONS

"JP_2011163719_A_M—Machine Translation.pdf", machine translation, EPO.org, Feb. 2, 2021. (Year: 2021).*
(Continued)

Primary Examiner — Steven B Mcallister
Assistant Examiner — Daniel E. Namay
(74) Attorney, Agent, or Firm — ScienBiziP, P.C.

(57) ABSTRACT

A water receiving member is reduced in size and is therefore made difficult to visually recognize. A cooking device (1) includes a main body (11), a front door (12), and a waste receiving member (41). The front door (12) has a water droplet restraining part (33) provided on a lower portion of an inner surface of the front door (12) which inner surface faces the heating room (13). While the front door (12) is closed, the water droplet restraining part (33) protrudes diagonally downwardly or horizontally from the inner surface of the front door (12) toward a rear side of the main body (11).

7 Claims, 6 Drawing Sheets (51) Int. Cl.
*F24C 1/00* (2006.01)
*F24C 9/00* (2006.01)
*F24C 15/00* (2006.01)
*F24C 15/14* (2006.01)
*A47J 27/04* (2006.01)

(52) U.S. Cl.
CPC ............ *F24C 15/003* (2013.01); *F24C 15/14* (2013.01); *A47J 2027/043* (2013.01)

(58) Field of Classification Search
USPC .......................................... 126/190, 326, 20
See application file for complete search history.

(56) References Cited

U.S. PATENT DOCUMENTS

| | | | |
|---|---|---|---|
| 6,382,085 B1* | 5/2002 | Dotan | A47J 37/0623 99/331 |
| 7,282,674 B2* | 10/2007 | Hansen | F24C 7/08 126/190 |
| 9,060,523 B1 | 6/2015 | Buller-Colthurst | |
| 9,149,058 B2* | 10/2015 | Bilet | A47J 27/16 |
| 10,080,262 B2* | 9/2018 | Mineoka | F24C 15/327 |
| 2004/0159317 A1 | 8/2004 | Walther et al. | |
| 2007/0215142 A1* | 9/2007 | Uchiyama | F24C 1/04 126/369 |
| 2010/0154656 A1* | 6/2010 | Yamamoto | F24C 15/327 99/467 |
| 2011/0146653 A1 | 6/2011 | Kitatani | |
| 2013/0118470 A1 | 5/2013 | Armstrong et al. | |
| 2013/0156906 A1 | 6/2013 | Raghavan et al. | |
| 2013/0259455 A1 | 10/2013 | Schootstra et al. | |
| 2014/0199455 A1* | 7/2014 | Bilet | A23L 5/13 426/510 |
| 2015/0374161 A1* | 12/2015 | Bilet | A23L 5/13 99/330 |
| 2016/0029841 A1 | 2/2016 | Walker | |
| 2016/0360577 A1* | 12/2016 | Mineoka | F24C 15/327 |
| 2017/0059171 A1 | 3/2017 | Kitayama et al. | |
| 2017/0319006 A1 | 11/2017 | Niizumi | |
| 2018/0235239 A1 | 8/2018 | Reese et al. | |
| 2020/0182481 A1 | 6/2020 | Bhogal et al. | |

FOREIGN PATENT DOCUMENTS

| | | | | |
|---|---|---|---|---|
| CN | 103080654 A | 5/2013 | | |
| CN | 203226682 U | 10/2013 | | |
| CN | 103884030 A | 6/2014 | | |
| CN | 105342490 A | 2/2016 | | |
| DE | 4116547 C1 * | 9/1992 | ............. | A47J 27/16 |
| JP | S57-121802 U | 7/1982 | | |
| JP | H03-164125 A | 7/1991 | | |
| JP | 2005-077019 A | 3/2005 | | |
| JP | 2005-077020 A | 3/2005 | | |
| JP | 2007-093091 A | 4/2007 | | |
| JP | 2007-132566 A | 5/2007 | | |
| JP | 2007-232270 A | 9/2007 | | |
| JP | 2009-250494 A | 10/2009 | | |
| JP | 2011-047612 A | 3/2011 | | |
| JP | 2011-163719 A | 8/2011 | | |
| JP | 2011-243320 A | 12/2011 | | |
| JP | 2012-052703 A | 3/2012 | | |
| JP | 2014-211246 A | 11/2014 | | |
| JP | 2015-135235 A | 7/2015 | | |
| JP | 2016-031156 A | 3/2016 | | |
| TW | I382827 B | 1/2013 | | |
| WO | WO-2008010386 A1 * | 1/2008 | ............. | F24C 15/04 |
| WO | WO-2014192241 A1 * | 12/2014 | ............. | F24C 15/14 |
| WO | 2016/117667 A1 | 7/2016 | | |

OTHER PUBLICATIONS

Non-Final Office Action dated May 6, 2020 for U.S. Appl. No. 16/073,129.
Notification of Reasons for Refusal issued against Japan Patent Application No. 2017-079950 dated Dec. 26, 2017.
Co-pending letter regarding a related application which the Application Number is U.S. Appl. No. 16/078,402.
Co-pending letter regarding a related application which the Application Number is U.S. Appl. No. 16/073,129.
Non-Final Office Action dated Jun. 18, 2020 for U.S. Appl. No. 16/078,402.

* cited by examiner

COOKER

TECHNICAL FIELD

The present invention relates to a cooking device for cooking food.

BACKGROUND ART

In a case where food containing water is cooked in a cooking device, steam is generated from the food. The steam thus generated is condensed in a heating room of the cooking device. The amount of such condensation in a heating room is particularly significant in the case of a cooking device in which steam is utilized. In such a cooking device, after cooking is done, for example, a water droplet generated through condensation runs along (i) a front plate and/or (ii) an inner surface of a front door, each of which is provided on a front surface of a main body of the cooking device. The water droplet then falls toward a lower part of the cooking device. As disclosed in Patent Literature 1, therefore, a cooking device includes a water receiving container provided below the front door and the front plate so as to receive a falling water droplet.

Figure 6:
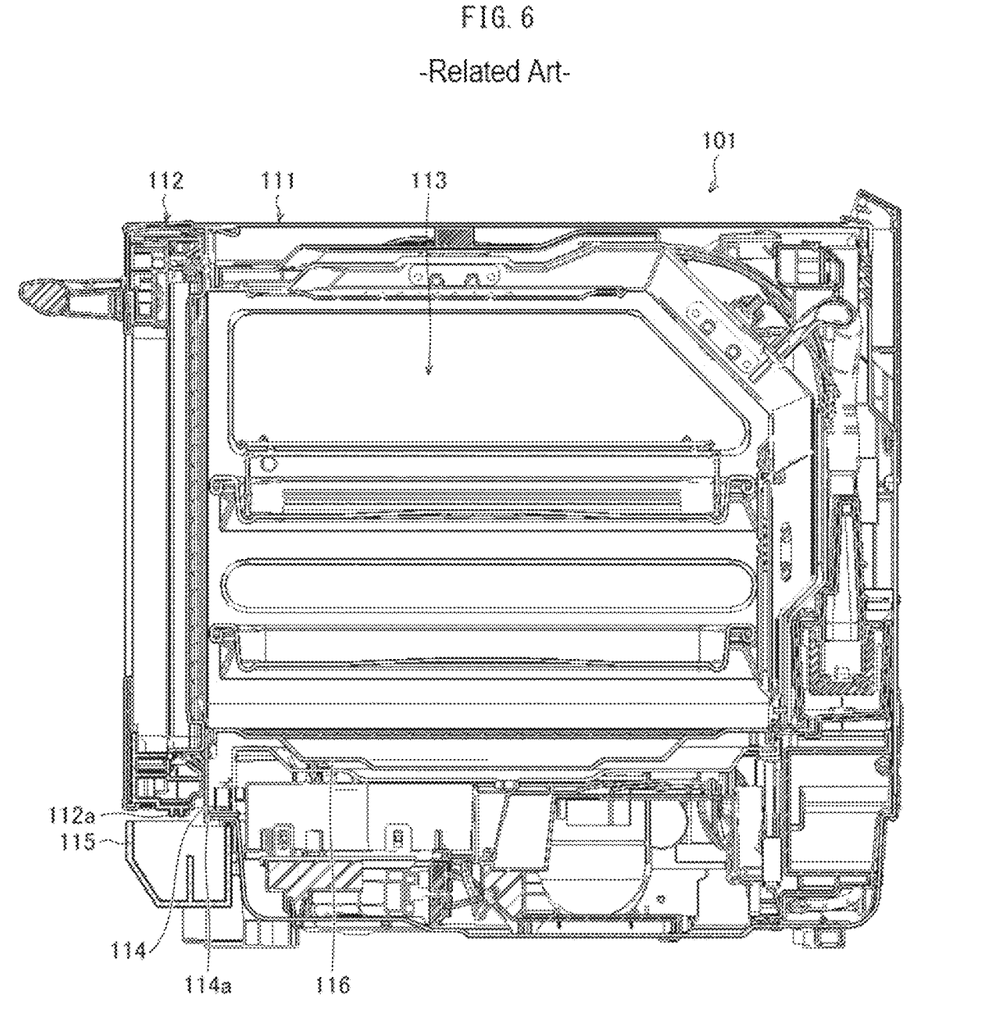
FIG. 6 is a vertical cross-sectional view illustrating a conventional cooking device.
Figure 7:
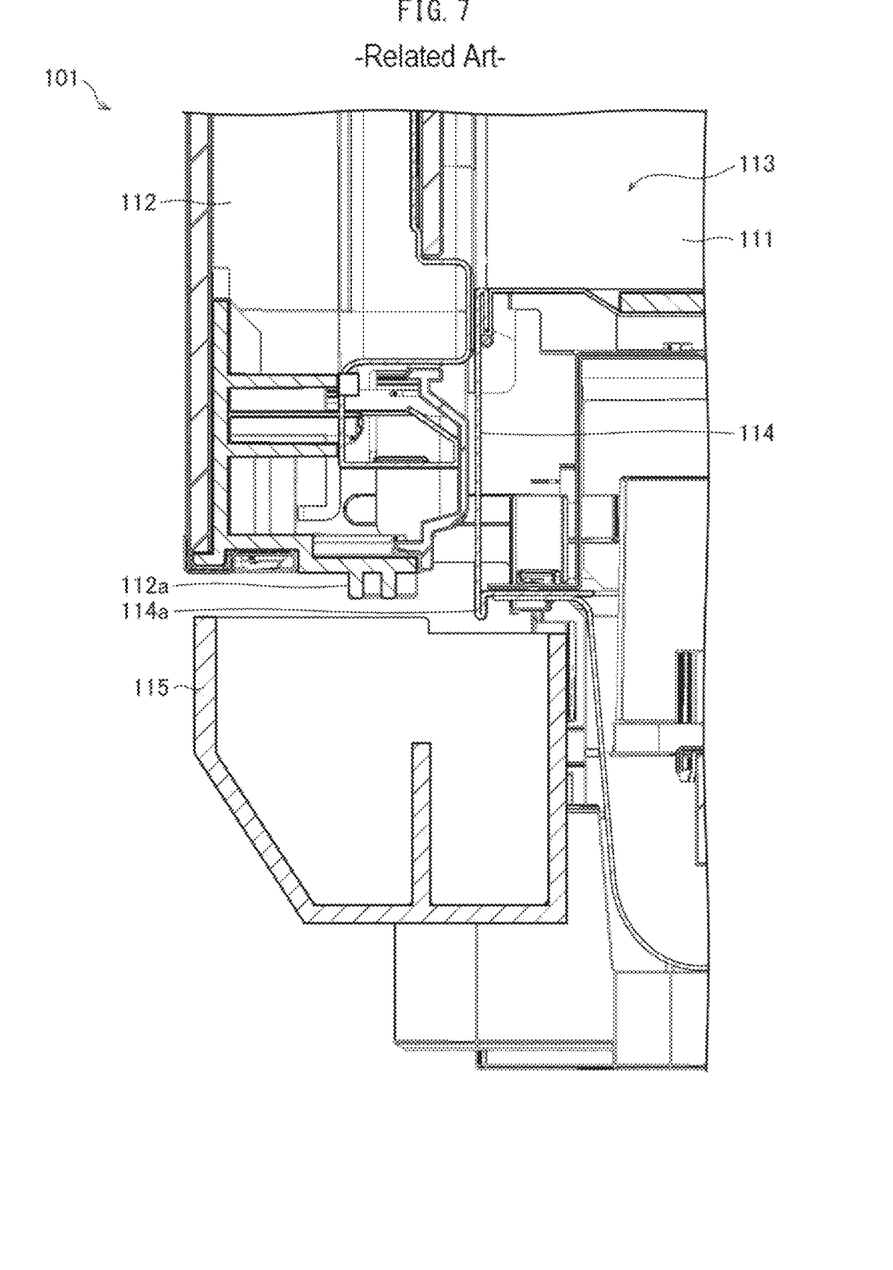
FIG. 7 is a vertical cross-sectional view illustrating respective structures of a front door, a lower portion of a main body, and a water receiving container each illustrated in FIG. 6 and (ii) their positional relationship.

Specifically, according to a configuration disclosed in Patent Literature 1, (i) a cooking device 101 includes a main body 111 and a front door 112 which is attached to the main body 111 so as to be openable and closable, and (ii) the main body 111 has a heating room 113 which is closed in a case where the front door 112 is closed (see FIGS. 6 and 7). The main body 111 has a front plate 114 having a water droplet restraining part 114a, provided at a lower end of the front plate 114, which extends vertically downwardly. The front door 112 has a rib-like water droplet restraining part 112a, provided at a lower end of the front door 112, which extends downwardly.

The water droplet restraining part 114a of the front plate 114 is configured to (i) prevent a water droplet dripping along the front plate 114 from moving to a rear side of a bottom surface of the main body 111 and (ii) cause the water droplet to fall off from the water droplet restraining part 114a. Similarly, the water droplet restraining part 112a of the front door 112 is configured to (i) prevent a water droplet dripping along an inner surface of the front door 112 from moving to a front side of a bottom surface of the front door 112 and (ii) cause the water droplet to fall off from the water droplet restraining part 112a. The size and location of a water receiving container 115 are therefore set so that the water receiving container 115 can receive water droplets falling off from the water droplet restraining part 114a and the water droplet restraining part 112a.

CITATION LIST

Patent Literature

[Patent Literature 1]
Japanese Patent Application Publication Tokukai No. 2016-31156

SUMMARY OF INVENTION

Technical Problem

However, according to such a conventional configuration, the water receiving container 115 needs to have a wide area in a front-to-rear direction of the cooking device 101, so as to receive water droplets falling off from the water droplet restraining part 114a and the water droplet restraining part 112a which are arranged in the front-to-rear direction of the cooking device 101. Therefore, the water receiving container 115 is unfortunately large-sized.

Moreover, a front surface of the water receiving container 115 is located so as to be easily visually recognized by a user when the cooking device 101 is viewed from the front. It follows that at least the front surface of the water receiving container 115 is required to conform to a front surface of the cooking device 101 in terms of design. This poses restrictions on the shape and/or material of the water receiving container 115. Consequently, the water receiving container 115 unfortunately cannot be produced at low cost with the use of, for example, an inexpensive material.

Therefore, an object of the present invention is to provide a cooking device including a small-sized water receiving member which is difficult to visually recognize when the cooking device is viewed from the front.

Solution to Problem

In order to attain the above object, a cooking device in accordance with an aspect of the present invention includes: a main body having a heating room therein; a front door, provided in front of the main body, which covers an opening of the heating room so as to be operable and closable; and a water receiving member provided below the main body, the front door having a water droplet restraining part provided inner surface faces the main body, the water droplet restraining part being configured to restrain a water droplet, which runs along the inner surface of the front door and then falls, from moving to a bottom surface of the front door and (ii) cause the water droplet to fall into the water receiving member, and while the front door is closed, the water droplet restraining part protruding diagonally downwardly or horizontally from the inner surface of the front door toward a rear side of the main body.

Advantageous Effects of Invention

According to an aspect of the present invention, the water receiving member is reduced in size and is therefore made difficult for a user to visually recognize when the cooking device is viewed from the front. This makes it unnecessary for at least a front surface of the water receiving member to conform to a front surface of the cooking device in terms of design, and therefore makes it possible to produce the water receiving member at low cost with the use of, for example, an inexpensive material.

DESCRIPTION OF EMBODIMENTS

Embodiment 1

Figure 1:
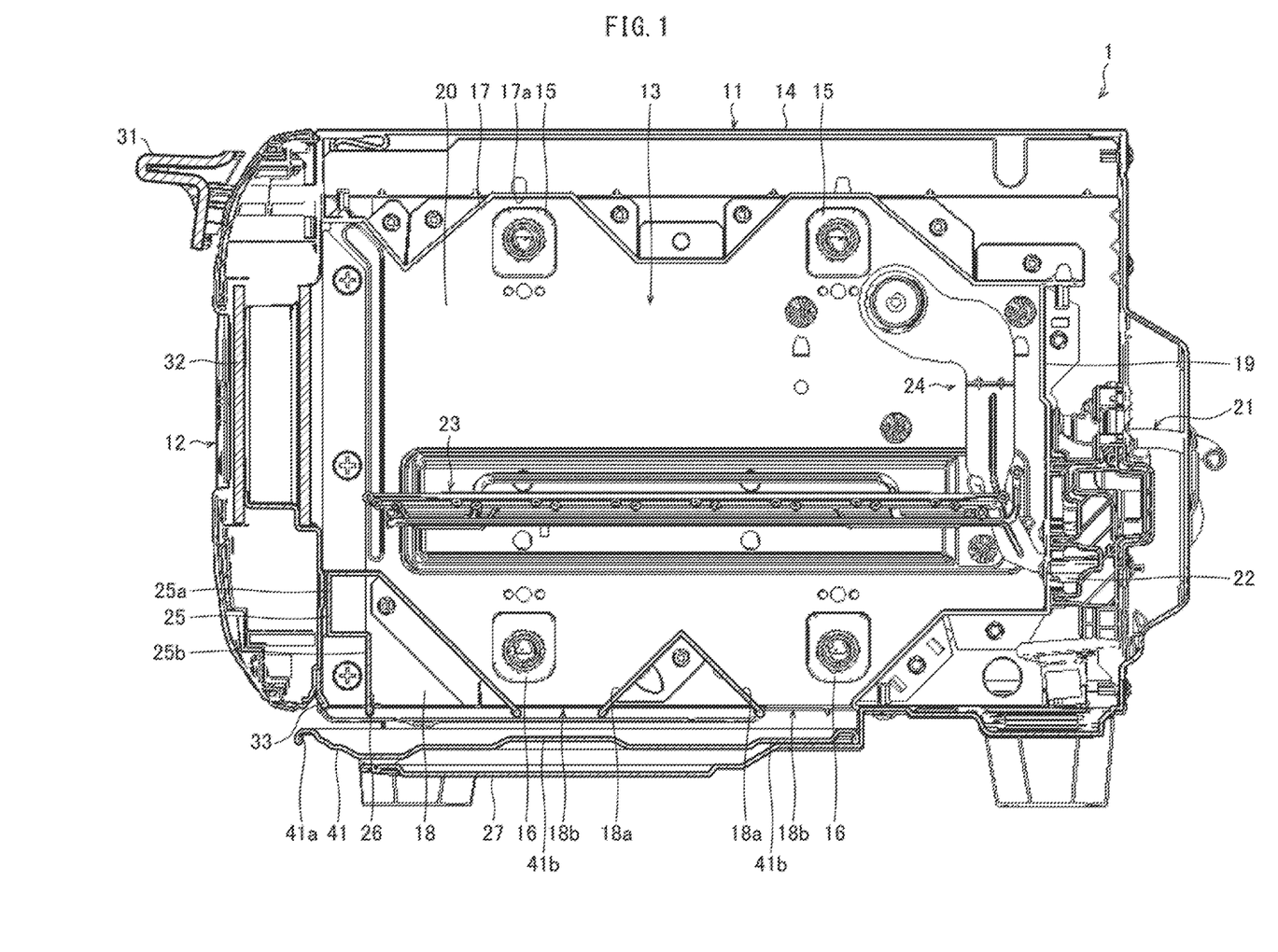
FIG. 1 is a vertical cross-sectional view illustrating a cooking device in accordance with Embodiment 1 of the present invention.
Figure 2:
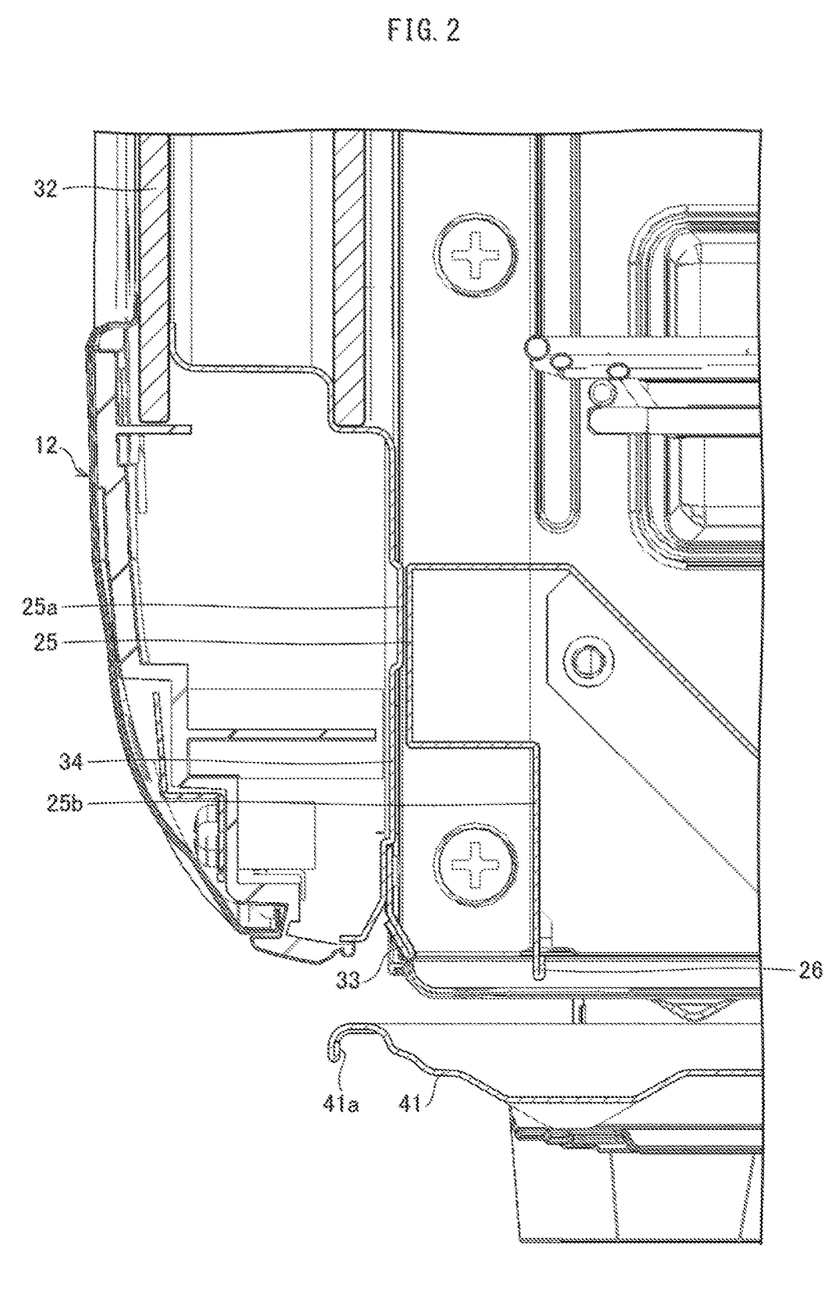
FIG. 2 is a vertical cross-sectional view illustrating respective structures of a front door, a lower portion of a main body, and a front portion of a waste receiving member each illustrated in FIG. 1 and their positional relationship.
Figure 3:
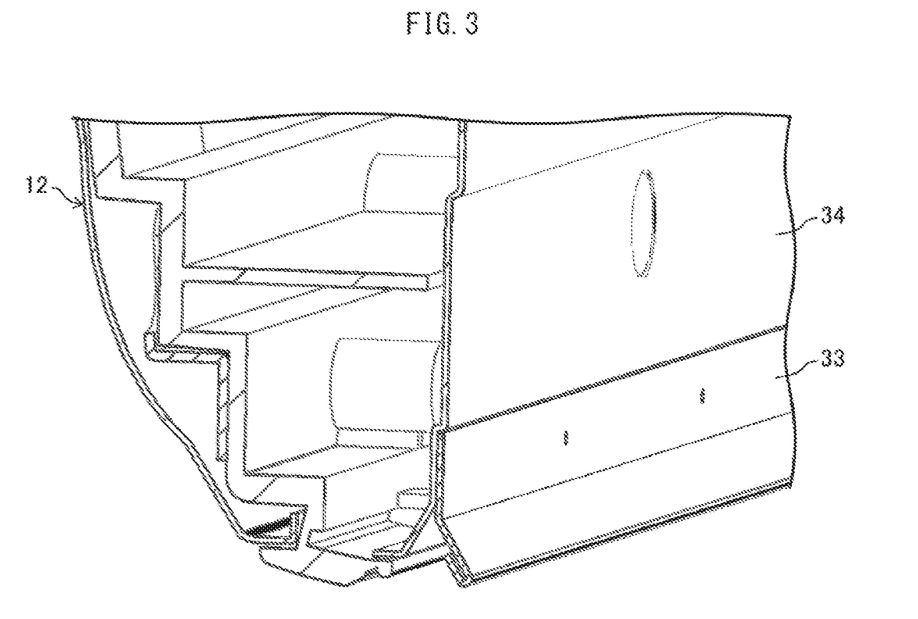
FIG. 3 is a perspective view illustrating a vertical cross-section of a lower portion of the front door illustrated in FIG. 1.
Figure 4:
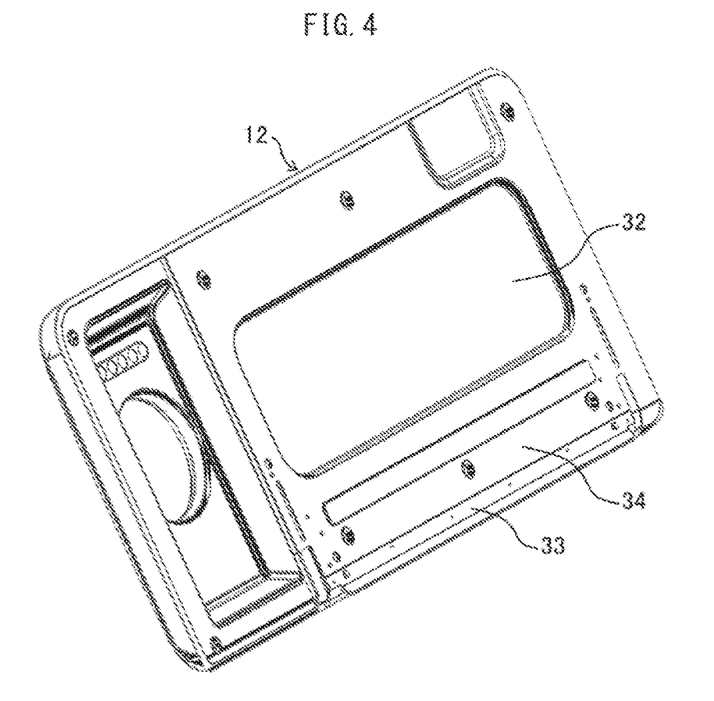
FIG. 4 is a perspective view illustrating an inner surface of the front door illustrated in FIG. 1.

The following description will discuss Embodiment 1 of the present invention with reference to the drawings. A cooking device discussed in Embodiment 1 is a toaster oven which serves as a cooking device in accordance with an aspect of the present invention. FIG. 1 is a vertical cross-sectional view illustrating the cooking device in accordance with Embodiment 1. FIG. 2 is a vertical cross-sectional view illustrating (i) respective structures of a front door, a lower portion of a main body, and a front portion of a waste receiving member each illustrated in FIG. 1 and (ii) their positional relationship. FIG. 3 is a perspective view illustrating a vertical cross-section of a lower portion of the front door illustrated in FIG. 1. FIG. 4 is a perspective view illustrating an inner surface of the front door illustrated in FIG. 1.

(Outline of Configuration of Cooking Device)

As illustrated in FIG. 1, a cooking device 1 includes a main body 11 and a front door 12, which is attached to the main body 11 so as to be operable and closable. The front door 12 is rotatable about a portion in the vicinity of a lower end of the front door 12, so as to open and close a heating room 13 of the main body 11. The cooking device 1 also includes a waste receiving member (a water receiving member, a food crumb receiving member) 41 which is provided below the main body 11 and which has the shape of a tray.

(Configuration of Main Body)

The main body 11 includes a housing 14 having the shape of a box whose front surface is open. The housing 14 has therein the heating room 13 surrounded by an upper wall 17, a bottom wall 18, a rear wall 19, and right and left side walls 20. At an upper portion of the heating room 13, there are provided two upper heaters 15 which are a front one and a rear one in the heating room 13 and which extend parallel to each other in a front-to-rear direction. Similarly, at a lower portion of the heating room 13, there are provided two lower heaters 16 which are a front one and a rear one in the heating room 13 and which extend parallel to each other in the front-to-rear direction.

The upper wall 17 of the heating room 13 has heater placement portions 17a which are recessed upwardly, so that the upper heaters 15 are disposed in the respective heater placement portions 17a. The bottom wall 18 of the heating room 13 has heater placement portions 18a which are recessed downwardly, so that the lower heaters 16 are disposed in the respective heater placement portions 18a. The two heater placement portions 18a of the bottom wall 18 have respective bottom parts which are open so as to serve as bottom wall openings 18b.

Between the rear wall 19 of the heating room 13 and the housing 14, there is provided a superheated steam generating device (superheated steam generating section) 21. The superheated steam generating device 21 is configured to (i) generate superheated steam and (ii) send the superheated stream into the heating room 13 via a steam outlet 22. The rear wall 19 therefore has an opening made at a location corresponding to the steam outlet 22.

Between the upper heaters 15 and the lower heaters 16 in the heating room 13, there is provided a food placement part 23 on which food to be cooked is to be placed. As the food placement part 23, a grill is used in a case where, for example, bread is to be toasted. The food placement part 23 is controlled by a food placement part driving section 24 so as to be movable between (i) a position where the food placement part 23 is housed in the heating room 13 and (ii) a position where a front portion of the food placement part 23 is located in front of the heating room 13. The food placement part driving section 24 controls the food placement part 23 to move back and forth in response to opening and closing of the front door 12. Therefore, (i) the front portion of the food placement part 23 is located in front of the heating room 13 while the front door 12 is open, and the food placement part 23 is housed in the heating room 13 while the front door 12 is closed.

A front wall 25 is provided so as to surround an opening of the heating room 13, which opening is made at a front end of the heating room 13. The front wall 25 has a front door contact surface 25a which is in contact with an inner surface of the front door 12 while the front door 12 is closed. The front wall 25 is a plate-like member which is located between the housing 14 and the upper wall 17, the bottom wall 18, and the side walls 20, and which is connected to these walls. The housing 14 forms an outer surface of the cooking device 1.

The main body 11 is provided with a waste receiving member retaining part 27 provided on a bottom surface of the main body 11. The waste receiving member retaining part 27 holds the waste receiving member 41 so that the waste receiving member 41 is located below the main body 11. Specifically, the waste receiving member retaining part 27 is a plate-like member extending iii the front-to-rear direction of the main body 11. Between a top surface of the waste receiving member retaining part 27 and the bottom surface of the main body 11, the waste receiving member 41 is disposed. (i.e., housed).

(Configuration of Water Droplet Restraining Part of Main Body)

A part of the front wall 25 which part is located at a lower portion of the main body 11 has (i) an upper portion serving as the front door contact surface 25a and (ii) a lower portion serving as a recessed surface 25b which is recessed from the front door contact surface 25a toward a rear side of the main body 11. The recessed surface 25b of the front wall 25 has a lower end part which serves as a water droplet restraining part 26. The water droplet restraining part 26 protrudes so as to (i) prevent a water droplet, which runs along a surface (such as the front door contact surface 25a and the recessed surface 25b of the front wall 25) and drips, from moving to a rear side of the bottom surface of the main body 11 and (ii) cause the water droplet to fall off from the water droplet restraining part 26.

(Configuration of Front Door)

While the front door 12 is closed, the inner surface of the front door 12 is in contact with the front door contact surface 25a of the front wall 25 of the main body 11 so as to cover the heating room 13. The front door 12 has a handle 31 and an observation window 32. The handle 31 is provided at an upper portion of the front door 12, and is held when the front door 12 is to be opened and closed. The observation window 32 is provided at a center portion of the front door 12, and is used for observing the inside of the heating room 13.

(Configuration of Water Droplet Restraining Part of Front Door)

As illustrated in FIGS. 1 through 4, a water droplet restraining part 33 is provided in the vicinity of the lower end of the front door 12. As illustrated in FIG. 4, the water droplet restraining part 33 has the shape of a plate whose width in a vertical direction is small and whose length in the left-to-right direction is equal to or greater than the width of the opening of the heating room 13 (i.e., the dimension of the heating room 13 in the left-to-right direction). The water droplet restraining part 33 protrudes diagonally downwardly from a part in the vicinity of the lower end of the front door 12 toward the rear side of the main body 11. Alternatively, the water droplet restraining part 33 can protrude horizontally from the part in the vicinity of the lower end of the front door 12 toward the rear side of the main body 11.

The water droplet restraining part 33 has a lower end which is located closer to the rear side of the main body 11 than is the front door contact surface 25a of the front wall 25. Specifically, the water droplet restraining part 33 protrudes toward a space in front of the recessed surface 25b located below the front door contact surface 25a. The water droplet restraining part 33 is configured to (i) prevent a water droplet, which runs along the inner surface of the front door 12 and drips, from moving to a bottom surface of the front door 12 and (ii) cause the water droplet to fall off from the water droplet restraining part 33.

In Embodiment 1, the water droplet restraining part 33 is fixed to a door panel 34 with the use of, for example, a screw. The door panel 34 forms the inner surface of the front door 12. As illustrated in FIG. 3, the water droplet restraining part 33 is provided such that, on the inner surface of the front door 12, an upper end of the water droplet restraining part 33, at which upper end the water droplet restraining part 33 is connected to the door panel 34, does not protrude further than a surface of the door panel 34. This allows a water droplet, which runs down along the inner surface of the front door 12, to smoothly run from the door panel 34 to the water droplet restraining part 33. Note that the water droplet restraining part 33 can be formed by (i) downwardly extending a plate member of which the door panel 34 is made and (ii) bending the plate member thus extended.

(Configuration of Waste Receiving Member)

As illustrated in FIGS. 1 and 2, the waste receiving member 41 includes a grip 41a which is provided at a front end of the waste receiving member 41 and which is bent downwardly. A user can draw and push the waste receiving member 41 out of/into the waste receiving member retaining part 27 by holding the grip 41a. That is, by the user's operation, it is possible to move the waste receiving member 41 between (i) a housed position below the main body 11 (see FIG. 1) and (ii) a drawn-out position in front of the main body 11.

While the waste receiving member 41 is in the housed position, a front end of a container portion (i.e., a recess behind the grip 41a) of the waste receiving member 41 is located in front of (i.e., located further frontward in the front-to-rear direction of the cooking device 1 than) the lower end of the water droplet restraining part 33 of the front door 12. That is, the recessed container portion of the waste receiving member 41 is located below the lower end of the water droplet restraining part 33 of the front door 12 and (ii) a lower end of the water droplet restraining part 26 of the main body 11.

Specifically, the waste receiving member 41 has a front portion and a rear portion. The front portion is the recess, and is located below the water droplet restraining part 33 and below the water droplet restraining part 26 while the waste receiving member 41 is in the housed position. The rear portion has projections 41b and a recess provided between the projections 41b. The projections 41b are provided so as to face respective ones of the front and rear bottom wall openings 18b of the bottom wall 18 of the main body 11. Each of the projections 41b has a width and a length corresponding (i.e., equivalent) to those of a corresponding one of the bottom wall openings 18b, and has a flat top surface. This causes a space between each of the bottom wall openings 18b and the waste receiving member 41 (i.e., between each of the bottom wall openings 18b and a corresponding one of the projections 41b) to be narrow. In Embodiment 1, two projections 41b, which are a front one and a rear one, are provided so as to correspond to the number of the bottom wall openings 18b of the bottom wall 18.

The front portion of the waste receiving member 41 mainly serves as a water receiving tray, and the rear portion of the waste receiving member 41 mainly serves as a breadcrumb tray. Therefore, unlike the cooking device 101 which separately includes the water receiving container 115 and the breadcrumb tray 116 (see FIG. 6), the cooking device 1 includes the waste receiving member 41 which serves as both of a water receiving tray and a breadcrumb tray.

(Operation of Cooking Device)

An operation of the cooking device 1 thus configured will be described below. In a case where bread is to be toasted as cooking by the cooking device 1, a user opens the front door 12, and then places the bread on the food placement part 23, i.e., on a grill. Then, the user closes the front door 12, sets a cooking time, and then presses a start button. This causes the cooking device 1 to start cooking.

The cooking device 1 carries out cooking such that the bread on the food placement part 23 is toasted by the upper heaters 15 and the lower heaters 16 while the superheated steam generating device 21 sends superheated steam into the heating room 13. Then, in a case where the cooking time elapses so much that the cooking is done, the user opens the front door 12 and then takes out the bread thus toasted.

(How Water Droplet Generated Through Condensation Falls into Waste Receiving Member)

In the cooking device 1, condensation occurs on the walls of the heating room 13 and the inner surface of the front door 12. This is because (i) water evaporates from bread (i.e., food) and (ii) superheated steam is used during cooking. Therefore, in a case where cooking is done and then, in particular, the front door 12 is opened, water droplet generated on the front door 12 and the front wall 25 of the main body 11 through condensation moves downwardly. Specifically, water droplet generated on the inner surface of the front door 12 through condensation moves from the door panel 34 to the water droplet restraining part 33, and falls off from the water droplet restraining part 33 into the waste receiving member 41 without moving to the bottom surface of the front door 12. Meanwhile, water droplet generated on the front wall 25 through condensation moves from the front door contact surface 25a to the water droplet restraining part 26 via the recessed surface 25b, and then falls off from the water droplet restraining part 26 into the waste receiving member 41 without moving to the bottom surface of the main body 11. Moreover, water droplet generated on the upper wall 17, the rear wall 19, the side walls 20, and the bottom wall 18 inside the heating room 13 through condensation falls from the bottom wall openings 18b into the waste receiving member 41. This allows the water droplet generated in the heating room 13 through condensation to fall into and to be collected in the waste receiving member 41 without falling from the cooking device 1 onto a floor surface on which the cooking device 1 is placed. It is possible to draw out the waste receiving member 41 and then discard the water droplet thus collected in the waste receiving member 41.

(Advantages of Cooking Device)

According to the cooking device 1, the water droplet restraining part 33 of the front door 12 protrudes diagonally downwardly or horizontally from a part in the vicinity of the lower end of the front door 12 toward the rear side of the main body 11 instead of protruding down vertically from the front door 12 (specifically, instead of protruding down from the door panel 34). It is therefore possible to design the waste receiving member 41 such that, in a case where the waste receiving member 41 is in the housed position, the front end of the waste receiving member 41 is located closer to the rear side of the main body 11 than in a case where (i) the water droplet restraining part 112a, which corresponds to the water droplet restraining part 33, is provided on the bottom surface of the front door 12 as illustrated in FIG. 7 or (ii) the water droplet restraining part 33 simply protrudes down vertically. This allows a reduction in size of the waste receiving member 41, and therefore makes it difficult for a user to visually recognize the waste receiving member 41 when the cooking device 1 is viewed from the front. It is therefore unnecessary to cause at least the front surface of the waste receiving member 41 to conform to the front surface of the cooking device 1 in terms of design. This increases the degree of freedom in design. The waste receiving member 41 can therefore be produced at low cost with the use of, for example, an inexpensive material.

Since the lower end of the water droplet restraining part 33 is located closer to the rear side of the main body 11 than is the front door contact surface 25a of the front wall 25 of the main body 11, the water droplet restraining part 33 can (i) receive a water droplet falling from the front door contact surface 25a and (ii) cause the water droplet to fall into the waste receiving member 41. It is therefore possible to design the waste receiving member 41 such that the container portion (i.e., the recess) of the waste receiving member 41 is located closer to the rear side of the main body 11 than is the front door contact surface 25a. This allows a further reduction in size of the waste receiving member 41, and therefore makes it more difficult for the waste receiving member 41 to be visually recognized from the front.

Note that the water droplet restraining part 33 protrudes toward the space in front of the recessed surface 25b provided below the front door contact surface 25a. This makes it unnecessary to increase the length of the water droplet restraining part 33 in the vertical direction of the main body 11, so that the water droplet restraining part 33 can be short in length.

Since the recessed surface 25b is provided below the front door contact surface 25a of the main body 11, breadcrumbs created during toasting of bread are unlikely to become stuck between the front door 12 and the front wall 25, and are therefore easy to fall into the waste receiving member 41.

The waste receiving member 41 has the projections 41b which are provided so as to face the front and rear bottom wall openings 18b of the bottom wall 18 of the main body 11. The projections 41b mainly serve as a breadcrumb tray. This causes a space between each of the bottom wall openings 18b and the projections 41b to be narrow. In contrast, the conventional cooking device 101 illustrated in FIG. 6 is not configured in such a manner.

Therefore, according to the cooking device superheated steam is unlikely to leak from the bottom wall openings 18b. This allows a reduction in loss of the superheated steam which loss may occur due to leakage from the heating room 13.

According to the cooking device 1, a space between each of the bottom wall openings 18b and the waste receiving member 41 (i.e., between each of the bottom wall openings 18b and a corresponding one of the projections 41b) is narrow as described above. Therefore, the waste receiving member 41 (i.e., the projections 41b) serves to reflect, below the bottom wall openings 18b, heat generated by the lower heaters 16. This allows a reduction in loss of heat generated by the lower heaters 16.

Embodiment 2

The following description will discuss Embodiment 2 of the present invention with reference to the drawings. For convenience, members having functions identical to those described in Embodiment 1 are given the same reference signs, and the descriptions of such members are omitted.

The cooking device 1 illustrated in FIG. 1 includes the waste receiving member 41 which serves as both a water receiving tray and a breadcrumb tray. Alternatively, the cooking device 1 can include a water receiving tray and a breadcrumb tray separately instead of including the waste receiving member 41. In such a case, the water receiving tray has a recess which corresponds to the front portion of the waste receiving member 41 (i.e., the water receiving tray has a recess located below the water droplet restraining part 33 and the water droplet restraining part 26) (see, for example, FIG. 1), and the breadcrumb tray has a recess provided at the rear portion of the waste receiving member 41 (i.e., the breadcrumb tray has a recess provided between the front and rear projections 41b and the projections 41b).

The waste receiving member 41 is put into and drawn out from the cooking device 1 in the front-to-rear direction. In contrast, the water receiving tray and the breadcrumb tray are put into and drawn out from the coking device 1 in the left-to-right direction.

Embodiment 3

The following description will discuss Embodiment 3 with reference to the drawings. For convenience, members having functions identical to those described in Embodiments 1 and 2 are given the same reference signs, and the descriptions of such members are omitted.

(Configurations to Send Water to Superheated Steam Generating Device and to Discharge Water from Tank Housing Part)

Figure 5:
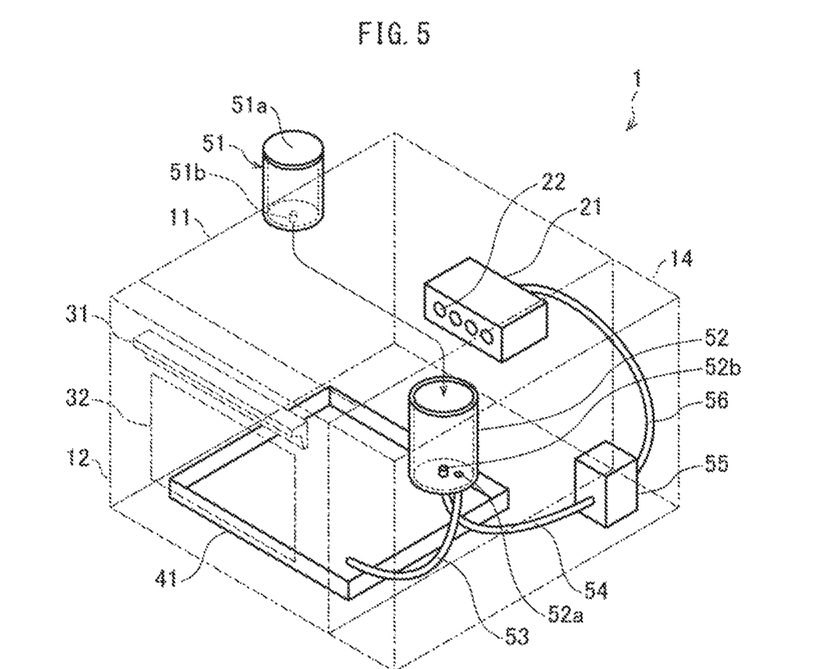
FIG. 5 is a perspective view illustrating an internal structure of a cooking device in accordance with Embodiment 3.

FIG. 5 is a perspective view illustrating an internal structure of a cooking device in accordance with Embodiment 3. As illustrated in FIG. 5, a cooking device 1 includes a water feed tank 51, a tank housing part 52, a water feed pump 55, and a superheated steam generating device 21.

The water feed tank 51 is mounted in the tank housing part 52 in a case where the cooking device 1 is to be used. The water feed tank 51 can be detached from the tank housing part 52 in a case where the water feed tank 51 is to be filled with water. The water feed tank 51 has a cylindrical side surface, and includes a cap 51a and a water inlet 51b. The cap 51a is provided on the top of the water feed tank 51, and the water inlet 51*b* is provided at a lower part of the inside of the water feed tank 51.

The tank housing part 52 has the shape of a cylindrical container. The tank housing part 52 is embedded in a lateral portion of the cooking device 1 such that an upper end of the tank housing part 52 has an opening in a top surface of a housing 14 of the cooking device 1. The tank housing part 52 has a drain outlet 52*a* and a water inlet engaging portion 52*b* which are provided at a bottom part of the inside of the tank housing part 52. To the drain outlet 52*a*, one end of a tube (drain pipe) 53 is connected. The other end of the tube 53 is placed in a waste receiving member 41. The water inlet engaging portion 52*b* engages with the water inlet 51*b* of the water feed tank 51 in a case where the water feed tank 51 is inserted into the tank housing part 52. This makes it possible to send water from the water feed tank 51 to the superheated steam generating device 21.

To the water inlet engaging portion 52*b* of the tank housing part 52, one end of a tube 54 is connected. The other end of the tube 54 is connected to the water feed pump 55. The water feed pump 55 is connected to the superheated steam generating device 21 via a tube 56. This allows water, which is stored in the water feed tank 51, to be sent to the superheated steam generating device 21 by the water feed pump 55. The tubes 53, 54 and 56 each can be, for example, a silicon tube.

The superheated steam generating device 21 generates superheated steam, and then sends the superheated steam from a steam outlet 22 into a heating room 13 through an opening made in a rear wall 19 of the heating room 13.

(How Water is Discharged from Tank Housing Part)

According to the cooking device 1 thus configured, mounting the water feed tank 51 into the tank housing part 52 by insertion allows water to be supplied from the water feed tank 51 to the superheated steam generating device 21. Water is supplied to the water feed tank 51 through detaching the water feed tank 51 from the tank housing part 52. In a case where the water feed tank 51 is detached from the tank housing part 52 while water is left in the water feed tank 51, the water left in the water feed tank 51 may spill into the tank housing part 52 due to disengagement of the water inlet 51*b* of the water feed tank 51 and the water inlet engaging portion 52*b* of the tank housing part 52 from each other. In such a case, the water is transferred from the drain outlet 52*a* into the waste receiving member 41 via the tube 53. Therefore, according to the cooking device 1, the waste receiving member 41 can also serve as a container into which water spilling out of the water feed tank 51 is to drain.

[Recap]

A cooking device 1 in accordance with a first aspect of the present invention includes: a main body 11 having a heating room 13 therein; a front door 12, provided in front of the main body 11, which covers an opening of the heating room 13 so as to be openable and closable; and a water receiving member (waste receiving member 41) provided below the main body 11, the front door 12 having a water droplet restraining part 33 provided on a lower portion of an inner surface of the front door 12 which inner surface faces main body 11, the water droplet restraining part 33 being configured to (i) restrain a water droplet, which runs along the inner surface of the front door 12 and then falls, from moving to a bottom surface of the front door 12 and (ii) cause the water droplet to fall into the water receiving member, and while the front door 12 is closed, the water droplet restraining part 33 protruding diagonally downwardly or horizontally from the inner surface of the front door 12 toward a rear side of the main body 11.

According to the above configuration, while the front door 12 is closed, the water droplet restraining part 33 protrudes diagonally downwardly or horizontally from the inner surface of the front door 12 toward the rear side of the main body 11. It is therefore possible to design the water receiving member such that a front end of the water receiving member is located closer to the rear side of the main body 11 than in a case where (i) the water droplet restraining part 33 is provided on the bottom surface of the front door 12 or the water droplet restraining part 33 simply protrudes down vertically. This allows a reduction in size of the water receiving member, and therefore makes it difficult for a user to visually recognize the water receiving member when the cooking device 1 is viewed from the front. It is therefore unnecessary to cause at least the front surface of the water receiving member to conform to the front surface of the cooking device 1 in terms of design. The water receiving member can therefore be produced at low cost with the use of, for example, an inexpensive material.

The cooking device 1 in accordance with a second aspect of the present invention is configured such that, in the first aspect of the present invention, the main body 11 has a front wall 25 which (i) surrounds the opening of the heating room 13 and (ii) has a front door contact surface 25*a* that is, while the front door 12 is closed, in contact with the inner surface of the front door 12; and the water droplet restraining part 33 has a lower end which is located closer to the rear side of the main body 11 than is the front door contact surface 25*a* of the front wall 25.

According to the above configuration, since the lower end of the water droplet restraining part 33 is located closer to the rear side of the main body 11 than is the front door contact surface 25*a* of the front wall 25, the water droplet restraining part 33 can (i) receive a water droplet falling from the front door contact surface 25*a* and (ii) cause the water droplet to fall into the water receiving member (waste receiving member 41). It is therefore possible to design the water receiving member such that a container portion (i.e., a recess) of the water receiving member is located closer to the rear side of the main body 11 than is the front door contact surface 25*a*. This allows a further reduction in size of the water receiving member, and therefore makes it more difficult for the water receiving member to be visually recognized from the front.

The cooking device 1 in accordance with a third aspect of the present invention is configured such that, in the first aspect of the present invention, the main body 11 has a front wall 25 which (i) surrounds the opening of the heating room. 13 and (ii) has a front door contact surface 25*a* that is, while the front door 12 is closed, in contact with the inner surface of the front door 12; a portion of the front wall 25, which portion is located at a lower portion of the main body 11, has a recessed surface 25*b* that is (i) located below the front door contact surface 25*a* and (ii) recessed from the front door contact surface 25*a* toward the rear side of the main body 11; and the water droplet restraining part 33 protrudes toward a space in front of the recessed surface 25*b*.

According to the above configuration, the water droplet restraining part 33 protrudes toward the space in front of the recessed surface 25*b* which is provided below the front door contact surface 25*a* and which is recessed from the front door contact surface 25*a* toward the rear side of the main body 11. This makes it unnecessary to increase the length of the water droplet restraining part 33 in a vertical direction of the main body 11, so that the water droplet restraining part 33 can be short in length.

The cooking device 1 in accordance with a fourth aspect of the present invention is configured to further include, in any one of the first through third aspects of the present invention, a superheated steam generating section (superheated steam generating device 21) which supplies superheated steam to the heating room 13; and a food crumb receiving member (waste receiving member 41) provided below a bottom wall 18 of the heating room 13, the bottom wall 18 of the heating room 13 having a bottom wall opening 18b, and the food crumb receiving member having a projection (projection 41b) which (i) is located so as to face the bottom wall opening 18b of the bottom wall and (ii) causes a space between the bottom wall opening 18b of the bottom wall and the food crumb receiving member to be narrow.

According to the above configuration, the food crumb receiving member has the projection which is located so as to face the bottom wall opening 18b and which causes a space between the bottom wall opening of the bottom wall and the food crumb receiving member to be narrow. Superheated steam is therefore hard to leak from the bottom wall opening 18b. This allows a reduction in loss of the superheated steam which loss may occur due to leakage from the heating room 13.

The cooking device 1 in accordance with a fifth aspect of the present invention is configured such that, in the fourth aspect of the present invention, the bottom wall 18 has a heater placement portion 18a having a recessed shape; a heater (lower heater 16) is provided in the heater placement portion 18a; and the bottom wall opening 18b is made in a bottom part of the heater placement portion 18a having the recessed shape.

According to the above configuration, the heater (lower heater 16) is provided in the heater placement portion 18a of the bottom wall 18 of the heating room 13, (ii) the bottom wall opening 18b is made in the bottom part of the heater placement portion 18a having the recessed shape, and (iii) the food crumb receiving member (waste receiving member 41) has the projection which is located so as to face the bottom wall opening 18b and which causes the space between the bottom wall opening of the bottom wall and the food crumb receiving member to be narrow. The projection of the food crumb receiving member therefore serves to reflect, below the bottom wall opening 18b, heat generated by the heater. This allows a reduction in loss of heat generated by the heater.

The cooking device 1 in accordance with a sixth aspect of the present invention is configured to further include, in the first aspect of the present invention, a superheated steam generating section (superheated steam generating device 21) which supplies superheated steam to the heating room 13; a water feed tank 51 in which water to be supplied to the superheated steam generating section is stored; a tank housing part 52 in which the water feed tank 51 is mounted, the tank housing part 52 having a shape of a container and having a drain outlet 52a in a bottom part of the tank housing part 52; and a drain pipe (tube 53) which is connected to the drain outlet 52a and through which water stored in the tank housing part 52 is transferred to the water receiving member (waste receiving member 41).

According to the above configuration, the water receiving member can also serve as a drain container into which water spilling out of the water feed tank 51 is to drain. This makes it unnecessary to provide a drain container which is intended solely for a water feed device including the water feed tank 51 and the like. It is therefore possible to reduce the number of components.

The cooking device 1 in accordance with a seventh aspect of the present invention is configured such that, in the fourth or fifth aspect of the present invention, a single waste receiving member 41 is provided so as to serve as the water receiving member and as the food crumb receiving member.

According to the above configuration, the single waste receiving member 41 serves as both of the water receiving member and the food crumb receiving member. This allows a reduction in number of components.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 Cooking device
11 Main body
12 Front door
13 Heating room
14 Housing
15 Upper heater
16 Lower heater
17 Upper wall
17a Heater placement portion
18 Bottom wall
18a Heater placement portion
18b Bottom wall opening
20 Side wall
21 Superheated steam generating device (superheated steam generating section)
22 Steam outlet
23 Food placement part
24 Food placement part driving section
25 Front wall
25a Front door contact surface
25b Recessed surface
26 Water droplet restraining part
27 Waste receiving member retaining part
33 Water droplet restraining part
41 Waste receiving member (water receiving member, food crumb receiving member)
41b Projection
51 Water feed tank
51b Water inlet
52 Tank housing part
52a Drain outlet
52b Water inlet engaging portion
53 Tube (drain pipe)
55 Water feed pump

The invention claimed is:

1. A cooking device, comprising:
a main body having a heating room therein;
a front door, provided in front of the main body, which covers an opening of the heating room so as to be openable and closable; and
a water receiving member provided below the main body,
the front door having a water droplet restraining part provided on a lower portion of an inner surface of the front door which inner surface faces the main body, the water droplet restraining part being configured to (i) restrain a water droplet, which runs along the inner surface of the front door and then falls, from moving to a bottom surface of the front door, and (ii) cause the water droplet to fall into the water receiving member while the front door is opened, and while the front door is closed, the water droplet restraining part protruding diagonally downwardly from the inner surface of the front door toward a rear side of the main body.

2. The cooking device as set forth in claim 1, wherein:

the main body has a front wall which (i) surrounds the opening of the heating room and (ii) has a front door contact surface that is, while the front door is closed, in contact with the inner surface of the front door; and the water droplet restraining part has a lower end which is located closer to the rear side of the main body than is the front door contact surface of the front wall.

3. The cooking device as set forth in claim 1, wherein:

the main body has a front wall which (i) surrounds the opening of the heating room and (ii) has a front door contact surface that is, while the front door is closed, in contact with the inner surface of the front door;

a portion of the front wall, which portion is located at a lower portion of the main body, has a recessed surface that is (i) located below the front door contact surface and (ii) recessed from the front door contact surface toward the rear side of the main body; and the water droplet restraining part protrudes toward a space in front of the recessed surface.

4. The cooking device as set forth in claim 1, further comprising:

a superheated steam generating section which supplies superheated steam to the heating room; and a food crumb receiving member provided below a bottom wall of the heating room, the bottom wall of the heating room having a bottom wall opening, and the food crumb receiving member having a projection which (i) is located so as to face the bottom wall opening of the bottom wall and (ii) causes a space between the bottom wall opening of the bottom wall and the food crumb receiving member to be narrow.

5. The cooking device as set forth in claim 4, wherein:

the bottom wall has a heater placement portion having a recessed shape;

a heater is provided in the heater placement portion; and the bottom wall opening is made in a bottom part of the heater placement portion having the recessed shape.

6. The cooking device as set forth in claim 4, wherein a single waste receiving member is provided so as to serve as the water receiving member and as the food crumb receiving member.

7. The cooking device as set forth in claim 1, further comprising:

a superheated steam generating section which supplies superheated steam to the heating room;

a water feed tank in which water to be supplied to the superheated steam generating section is stored;

a tank housing part in which the water feed tank is mounted, the tank housing part having a shape of a container and having a drain outlet in a bottom part of the tank housing part; and a drain pipe which is connected to the drain outlet and through which water stored in the tank housing part is transferred to the water receiving member.

* * * * *